(12) United States Patent
Simec et al.

(10) Patent No.: US 12,475,252 B2
(45) Date of Patent: Nov. 18, 2025

(54) INFORMATION SECURITY SYSTEMS AND METHODS THEREOF

(71) Applicant: Biojars Holdings Pty Ltd, North Sydney (AU)

(72) Inventors: Andrej Simec, North Sydney (AU); Stephen Robert Hogben, North Sydney (AU); Patrick Charles Purcell, North Sydney (AU)

(73) Assignee: Biojars Holdings Pty Ltd, North Sydney (AU)

( * ) Notice: Subject to any disclaimer, the term of this patent is extended or adjusted under 35 U.S.C. 154(b) by 293 days.

(21) Appl. No.: 18/252,755

(22) PCT Filed: Nov. 18, 2021

(86) PCT No.: PCT/AU2021/051379
§ 371 (c)(1),
(2) Date: May 12, 2023

(87) PCT Pub. No.: WO2022/104428
PCT Pub. Date: May 27, 2022

(65) Prior Publication Data
US 2024/0005031 A1    Jan. 4, 2024

(30) Foreign Application Priority Data

Nov. 23, 2020 (AU) ................................ 2020904320

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *H04L 9/0869* (2013.01); *H04L 9/3226* (2013.01)

(58) Field of Classification Search
None
See application file for complete search history.

(56) References Cited

U.S. PATENT DOCUMENTS

| 9,137,222 B2* | 9/2015 | Haeger | ............... H04L 63/0471 |
| 2005/0021480 A1* | 1/2005 | Haff | ......................... G07G 5/00 705/75 |

(Continued)

OTHER PUBLICATIONS

International Search Report for International Application No. PCT/AU2021/051379 dated Feb. 3, 2022, 6 pages.

(Continued)

*Primary Examiner* — Michael Pyzocha
(74) *Attorney, Agent, or Firm* — TraskBritt

(57) ABSTRACT

Embodiments of the present disclosure provide a system and a method of providing information security to information assets of a user. The information security system provides a more secure way of collecting, retrieving and storing data in one place to the users for their own use as well as for curating and sharing their most precious information assets such as, but not limited to, personal memories and precious information with selected friends and family, both now and in the future. The information security system includes a service management system, an encryption engine, a random data source, a secure third-party storage system, and a distribution and delivery device. The information security system is hack proof as it has high cryptographic strength and maintains high security and also usability/workability for potentially many years and decades in between uses.

8 Claims, 5 Drawing Sheets

(51) Int. Cl.
    *H04L 9/08*     (2006.01)
    *H04L 9/32*     (2006.01)

(56)            References Cited

U.S. PATENT DOCUMENTS

| | | | |
|---|---|---|---|
| 2014/0215210 A1* | 7/2014 | Wang | H04L 63/0428 |
| | | | 713/165 |
| 2014/0325681 A1* | 10/2014 | Kleidermacher | G06F 21/575 |
| | | | 726/29 |
| 2015/0381588 A1* | 12/2015 | Huang | G06F 21/6218 |
| | | | 713/153 |
| 2017/0006001 A1* | 1/2017 | Narayan | H04L 63/0281 |
| 2018/0198862 A1* | 7/2018 | Olds | H04L 67/566 |
| 2018/0211202 A1 | 7/2018 | Ynion, Jr. | |
| 2019/0013936 A1 | 1/2019 | Murray et al. | |
| 2019/0130082 A1 | 5/2019 | Alameh et al. | |
| 2020/0012801 A1 | 1/2020 | Porteret | |
| 2020/0193033 A1 | 6/2020 | Kurmi | |
| 2021/0144141 A1* | 5/2021 | Lee | G06F 21/602 |
| 2022/0069983 A1* | 3/2022 | Yoshida | H04L 9/12 |
| 2022/0158829 A1* | 5/2022 | Parkhill | H04L 9/0863 |

OTHER PUBLICATIONS

International Written Opinion for International Application No. PCT/AU2021/051379 dated Feb. 3, 2022, 8 pages.

* cited by examiner

100

INFORMATION SECURITY SYSTEMS AND METHODS THEREOF

CROSS-REFERENCE TO RELATED APPLICATIONS

This application is a national phase entry under 35 U.S.C. § 371 of International Patent Application PCT/AU2021/051379, filed Nov. 18, 2021, designating the United States of America and published as International Patent Publication WO 2022/104428 A1 on May 27, 2022, which claims the benefit under Article 8 of the Patent Cooperation Treaty to Australian Patent Application Serial No. 2020904320, filed Nov. 23, 2020.

TECHNICAL FIELD

The presently disclosed subject matter generally relates to the field of digital storage systems. Particularly, the present disclosure relates to an information security system and a method for storing the information (e.g., digital information) in a secure manner.

BACKGROUND

It may be attractive, practically and commercially, to provide a new approach to store information. For example, an approach to storing information that not only provides security but also can be used and trusted by both sophisticated and unsophisticated users with their most precious assets and information.

In the world today there is significant community concern regarding privacy, security and misuse of personal information of people by corporates who hold it. Companies, such as Facebook, have seen a measurable decline in usage arising from such community concerns about trust and privacy. There have been several well-documented large-scale losses of information in recent years. There have also been a number of incidents involving the leaking of information uploaded by companies to cloud-based storage.

There are many security tools and products or systems that make use of security tools and products, including online platforms (or social networking websites e.g., Facebook) that store and share user's personal information with a high level of security. Existing security products and approaches include Digital Rights Management (DRM) technology-based solutions. DRM technology is a set of technologies and products developed for the controlled distribution of audio-visual materials. A range of products based on the DRM technologies commercially available includes Irdeto, Verimatrix, Secure Media, Apple Fairplay, and Microsoft PlayReady. DRM technology meets many general security requirements such as including "zero-knowledge" systems, individualized secure encryption per item, highly secure key management system, strong access controls, and controlled exhibition/usage rules associated with each item. DRM technology solutions generally also have a range of client libraries available for personal computers as well as mobiles and tablets, in the form of browser plugins and also applications. This makes easy for application developers to integrate DRM technology. Whilst DRM technology-based solutions meet a number of core security requirements, by design these solutions are applied to audio-video information files (e.g., streaming movies).

DRM technology-based solutions do not fully encrypt all parts of all files, but only partly. These solutions also do not permit you parcellate an information asset into parts and apply different security to the parcellated components, to i.e., enable different discretionary access rules to be applied so that, for example, a user can share certain aspects of a single information asset with different people under different access permissions.

Additionally, DRM technology-based solutions are not designed to secure assets for a very long period (i.e., several generations of computing technology, (i.e., <40 years)).

Further, there security tools or products that use Public-Private Key (PPK) encryption (such as RSA, Diffie-Hellmann technologies) for storing information. As elements of an overall solution, PPK encryption is well placed to provide the "zero-knowledge" aspect of security requirements, and many of the requirements for managing the discretionary access aspects of the solution (i.e., applying different encryption for different users). However, PPK falls short in several key areas, notably in long-term security viability, support for users who lose their security keys, and single points of failure. As one aspect in an overall more complex product, PPK does potentially have a role to play. However, in itself and without additional functionality, PPK is not a readily usable product for end-consumers.

All cryptographic systems require a client to encrypt and decrypt the content. This is generally achieved by either using encryption technology that is built into a computer or mobile phone operating system ("native") or by a software client that is supplied with the service. In more complex systems, like DRM, these are special clients distributed to users. Irrespective of whether the client software is native to the device or not, the client resides on the user's device and performs its function on the user's device. Architecturally and technically, this is problematic long term because over decades there are major changes in technology and operating systems, as well as businesses/companies who provide support for the same. To illustrate this problem, there have been many complex and feature-rich security systems developed in the past 20 years that no longer exist or are supported such as Windows Rights Management, PGP, X.500, DivX, Window DRM v1, QuickTime, RealPlayer, Microsoft PlayReady v1, and so forth.

Cloud-based storage systems and products such as Google Drive, Amazon S3 and Amazon Glacier, and OneDrive (Microsoft) allow users to store and share information or files. These are all based on the principle of a secure vault per customer. The vault has access security and allows the owner to share individual files with others. The service may have an option of an encryption service that encrypts files that are stored. These systems also suffer from limitations. In vaults, the security service is applied to all contents of the vault and if it is compromised then all data in the vault is compromised. Vault systems do not possess functionality that permits the owner of the vault, or files in the vault, to share a file with another individual at a future date, or under-prescribed external events (such as incapacity or death). Further, the information elements cannot be broken down into components (or parcellated) and have separate security or access rules for each component. The overall security provided by such security tools is no better than the security and risk profile of the provider (e.g., Microsoft, Google or Amazon). Moreover, there is no completely independent unique security protection for vault-type systems. The typical way an owner would have to use this system is to curate separate information elements into unique files per recipient, each with their own rules and access, and share these. Practically, this may not be convenient for the owner as this requires content to be edited, encrypted and stored multiple times, and all components share many of the same security key or keys. This is a suboptimal way to manage information elements that are separately shared and there is a higher risk of security compromise by having a single security envelope that has a common set of risks. Further, the information stored is readily accessible by the service provider. These systems do not encrypt publicly shared information, and therefore its release cannot be controlled, nor its integrity protected.

Other cloud-based storage platforms, such as Facebook, Instagram and LinkedIn, use a combination of user access controls and a strong security perimeter on cloud-stored assets. However, they have shortcomings as the service system manager retains read access to all stored information. Also, if the security is compromised for any owner (i.e., the user), then it would be compromised for all users, in that a malignant party could alter any and all stored information and users might not become easily aware of this.

All of the above-described potential approaches and security solution for storing information have some core common shortcomings relating to the longevity of security protection. These includes: whether the encryption algorithm used will withstand a brute force attack in (say) 20 years; and whether the key elements of the security solution—and, in particular, the client-side security encryption and decryption software that may be necessary for this complexity of solution—will be still be available to users. Any security system based on asymmetric keys requires periodic upgrading and re-encryption of assets if it is contemplated securing information assets for a long period. On the other hand, symmetric keys may be less susceptible to quantum or conventional computing attacks using known algorithms (such as Shors Algorithm)—for example, AES-128 CBC encryption statistically has a 3.4×1038 chance of compromise—requiring 318,000,000,000,000,000,000 years using the fastest computer in the world (in 2020).

Existing approaches, products and methodologies have shortcomings, as they do not offer security protection for periods of decades due to the strength of original encryption. Further, they do not provide a level of security over and above cloud storage systems to achieve: independence from native security from these systems, and therefore providing each user with a choice of where they may store their information securely; and protection of assets from compromise or alteration by malignant parties who may break these commercial systems. Further, they do not permit a user to break down an information asset into component (or parcellated) parts and apply original and totally independent security to each element. Further, they are susceptible to compromise if any or all internet-connected elements of the solution are compromised.

BRIEF SUMMARY

To overcome the above-mentioned limitations and problems, the present disclosure provides a solution in a format that is usable and available to small and unsophisticated users.

The present disclosure provides information security system and methods of managing information security. The information security system provides a more secure way of collecting, retrieving and storing personal data in one place to the users for their own use as well as curating and sharing their most personal memories and precious information with selected friends and family, both now and in the future. In some embodiments, the information security system enables a user to store information such as, but not limited to, digital data, files, images, documents, etc., in a secure manner on digital platforms and formats such as, but not limited to, a computer, an online database, an offline storage device, a digital image, and so forth. The information security systems and methods have high cryptographic strength and maintain high security and also usability/workability for potentially many years and decades in between uses.

The present disclosure provides an information security system configured to provide a cloud-based security proxy service to a plurality of users that, via application of security technologies and methodologies, provides a service offering that protects information being transferred over a network and stored in a public cloud storage service. Further, the information security system provides encrypted protection of information assets, which may be impervious to brute force attack for long periods of time, such as for at least 40 years. The information security system is configured to implement security in a manner so as to permit complex discretionary access controls to be implemented. This may allow independent encryption and specific user access permissions to individual sub-elements/component of a single information resource/asset. The information security system may allow a wide range of consumers and unsophisticated users to use the information security system independent of the operating system, technology and specifics of the client device accessing the system. Further, the information security system may permit access permissions and arrangements to individual protected information to vary based on external events, and to be managed by owner-delegated individuals without permission to access the content. The information security system may also permit the owner to control the integrity and release of all assets, including public (general accessed) information assets. The system may not be reliant for its integrity on the technology and security functions available in commercial cloud storage service products. The security of the information stored using the information security system is not compromised in the event of a compromise in any or all internet-connected servers and platforms that operate the system or the service.

An embodiment of the present disclosure provides an information system including a service management system, an encryption engine, a random number source, a distribution and delivery device, and a security third-party storage system. The service management system is configured to receive at least one information asset from at least one user for storage. The encryption engine configured to receive the at least one information asset in its component files and unique identifying information (userID) of the at least one user from the service management system. The random number source configured to provide genuine random numbers to the encryption engine, wherein the encryption engine generates one or more encryption keys based on the genuine random numbers. In some embodiments, the genuine random numbers may be unique numbers generated on demand. The distribution and delivery device may be configured to encrypt the at least one information asset using the one or more encryption keys. The distribution and delivery device may also store the encrypted information asset. The secure third-party storage system is configured to accept the encrypted information asset for storing securely. The secure third-party storage system is configured to return the stored encrypted information asset on demand upon presentation of correct credentials to the distribution and delivery device, wherein the distribution and delivery device presents the information asset to the at least one user upon receiving a retrieve request.

According to an aspect of the present disclosure, the service management system is further configured to receive a network address where the at least one information asset is located from the at least one user. Further, the service management system is configured to retrieve the at least one information asset from the network address for storage.

According to another aspect of the encryption engine may be configured to obtain a genuine random number (r) from the random number source.

In some embodiments, the encryption engine may use the genuine random number (r) to create a unique encryption key (k).

In some embodiments, the secure third-party storage system may generate another encryption key (KEK) from a pseudo random number function.

In some embodiments, the encryption engine generates the another encryption key (KEK) from a pseudo random number function and encrypts the at least one information asset by using the unique encryption key (k).

In some embodiments, the encryption engine may encrypt the at least one information asset by using the unique encryption key (k).

In some embodiments, the encryption engine may store the encrypted at least one information asset in the distribution and delivery device.

In some embodiments, the encryption engine may send the unique encryption key (k) to the secure third-party storage system.

According to another aspect of the present disclosure, the secure third-party storage system is configured to encrypt the unique encryption key (k) using the another encryption key (KEK) to create an encrypted unique encryption key (eK).

In some embodiments, the secure third-party storage system may store the resultant encrypted unique encryption key (eK) together with a one-way transformation of the KEK (KEKID).

In some embodiments, the secure third-party storage system may generate a unique key ID (KID) that corresponds to the eK.

In some embodiments, the secure third-party storage system may return the another encryption key (KEK) and unique key ID (KID) to the encryption engine.

In some embodiments, the secure third-party system may validate a received another encryption key (KEK) with the one-way transformation of the KEK (KEKID) by matching the one-way transformation of the KEK (KEKID) with the one-way transformation of the received another encryption key (KEK).

In some embodiments, the encryption engine may return the unique key ID (KID) and the another encryption key (KEK) to the service management system with the unique identifying information (userID) and filename of the at least one information asset.

In some embodiments, the encryption engine may delete the unique encryption key (k), the unique key ID (KID), the another encryption key (KEK), and the original at least one information asset.

According to another aspect of the present disclosure, the service management system is configured to enable the at least one user to create an IP session with the service management system. The service management system may receive at least one of the retrieve request and a delete request from the at least one user, wherein the retrieve request comprising a filename of the information asset to be retrieved, wherein the delete request comprising a filename of a pre-stored information to be deleted. Further, the service management system may pass information comprising at least one of the retrieve request, the delete request, the unique identifying information (userID), the filename of the information asset to be retrieved, the filename of the pre-stored information asset to be deleted, the another encryption key (KEK) that was provided to the at least one user or stored in the service management system when the information asset was originally stored, a key ID (KID) that was provided to the at least one user or stored in the service management system when the information asset was originally stored, an IP address, a file type, and a time period to the encryption engine.

For retrieving the information asset, the encryption engine is further configured to request a unique encryption key (k) from the secure third-party storage system using the key ID (KID) to reference the unique encryption key (k) and provide the another encryption key (KEK) to decrypt the unique encryption key (k), wherein when the another encryption key (KEK) is verified against the stored one-way transformation of the KEK (KEKID), then the secure third-party storage system knows that the credentials are correct and actions the retrieve request to return the unique encryption key (k) and the key ID (KID).

In some embodiments, the encryption engine is configured to obtain the encrypted stored information asset from the distribution and delivery device based on the unique encryption key (k).

In some embodiments, the encryption engine may decrypt the encrypted stored information asset using the unique encryption key (k).

In some embodiments, the encryption engine may send the decrypted information asset to the distribution and delivery device.

For deleting the pre-stored information asset, the encryption engine may further be configured to receive information comprising at least one of the delete request, a filename of the pre-stored information asset, the user identifying information (userID), the another encryption key (KEK) that was provided to the at least one user or stored in the service management system when the information asset was originally stored, and a key ID (KID) that was provided to the at least one user or stored in the service management system when the information asset was originally stored from the service management system.

In some embodiments, the encryption engine may send the another encryption key (KEK) and the key ID (KID) to the secure third-party storage system.

In some embodiments, when the secure third-party storage system verifies that another encryption key (KEK) and the key ID (KID) are correct, then a key object comprising the pre-stored information asset is deleted to render the pre-stored information asset permanently unreadable. Then, the secure third-party storage system notifies the encryption engine about the deletion of the key object comprising the pre-stored information asset.

In some embodiments, the encryption engine may at least one of delete the encrypted pre-stored information asset and directs the distribution and delivery system to delete the encrypted pre-stored information asset.

According to an aspect of the present disclosure, the encryption engine is further configured to encrypt an information asset (such as a highly confidential or sensitive information asset) with a unique encryption key (k). The highly confidential or sensitive information asset may be any information of high value e.g., bank details, bank login details, and so forth. Further, the encryption engine may convert the resultant encrypted information asset to a character set that uses visible characters (e.g., A-Z, a-z, 0-9) using the Base64 method. The Base64 is a group of binaryto-text encoding schemes that represent binary data (more specifically a sequence of 8-bit bytes) in an ASCII string format by translating it into a radix-64 representation. The encryption engine may input the resultant Base64 version of the resultant encrypted information asset comprising an image of the encrypted information asset to a steganography algorithm. The steganography algorithm is used to hide the resultant encrypted information asset within an image. The image used by the steganography algorithm can be either supplied by the user, or taken from the user's profile.

Another embodiment of the present disclosure provides a method of managing a plurality of information assets of at least one user. The method includes receiving, by a service management system, at least one information asset from the at least one user for storage. The method also includes receiving, by an encryption engine, the at least one information asset in its component files (e.g., image, video, text, spreadsheet, etc.) and unique identifying information (userID) of the at least one user from the service management system. The method further includes providing, by a random number source, genuine random numbers to the encryption engine for generating one or more encryption keys. The method further includes encrypting, by a distribution and delivery device, the at least one information asset using the one or more encryption keys. The method furthermore includes storing, by a distribution and delivery device, the encrypted information asset. The method further includes accepting, by a secure third-party storage system, the encrypted information asset for storing securely. The method also includes returning, by the secure third-party storage system, the stored encrypted information asset on demand upon presentation of correct credentials to the distribution and delivery device. The information asset is presented to the at least one user, by the distribution and delivery device, upon receiving a retrieve request.

According to an aspect of the present disclosure, the method also includes receiving, by the service management system, a network address where the at least one information asset is located from the at least one user; and retrieving, by the service management system, the at least one information asset from the network address for storage.

According to another aspect of the present disclosure, the method also includes obtaining, by the encryption engine, a genuine random number (r) from the random number source.

In some embodiments, the method also includes using, by the encryption engine, the genuine random number (r) to create a unique encryption key (k).

In some embodiments, the method also includes generating, by at least one of the secure third-party storage system and the encryption engine, another encryption key (KEK) from a pseudo random number function.

In some embodiments, the method also includes encrypting, by the encryption engine, the at least one information asset by using the unique encryption key (k).

In some embodiments, the method also includes storing, by the encryption engine, the encrypted at least one information asset in the distribution and delivery device.

In some embodiments, the method also includes sending, by the encryption engine, the unique encryption key (k) to the secure third-party storage system.

In some embodiments, the method also includes encrypting, by the secure third-party storage system, the unique encryption key (k) using the another encryption key (KEK) to create an encrypted unique encryption key (eK).

In some embodiments, the method also includes storing, by the secure third-party storage system, the resultant encrypted unique encryption key (eK) together with a one-way transformation of the KEK (KEKID).

In some embodiments, the method also includes generating, by the secure third-party storage system, a unique key ID (KID) that corresponds to the eK.

In some embodiments, the method also includes returning, by the secure third-party storage system, the another encryption key (KEK) and unique key ID (KID) to the encryption engine.

According to another aspect of the present disclosure, the method also includes validating, by the secure third-party storage system, a received another encryption key (KEK) with the one-way transformation of the KEK (KEKID) by matching the one-way transformation of the KEK (KEKID) with the one-way transformation of the received another encryption key (KEK).

The method also includes returning, by the encryption engine, the unique key ID (KID) and the another encryption key (KEK) to the service management system with the unique identifying information (userID) and filename of the at least one information asset.

The method further includes deleting, by the encryption engine, the unique encryption key (k), the unique key ID (KID), the another encryption key (KEK), and the original at least one information asset.

According to another aspect of the present disclosure, the method also includes enabling, by the service management system, the at least one user to create an IP session with the service management system.

Further, the method may include receiving, by the service management system, at least one of the retrieve request and a delete request from the at least one user, wherein the retrieve request comprising a filename of the information asset to be retrieved, wherein the delete request comprising a filename of a pre-stored information to be deleted.

Further, the method may include sending, by the service management system, information comprising at least one of the retrieve request, the delete request, the unique identifying information (userID), the filename of the information asset to be retrieved, the filename of the pre-stored information to be deleted, the another encryption key (KEK) that was provided to the at least one user or stored in the service management system when the information asset was originally stored, a key ID (KID) that was provided to the at least one user or stored in the service management system when the information asset was originally stored, an IP address, a file type, and a time period to the encryption engine.

According to another aspect of the present disclosure, the method also includes upon receiving the retrieve request from the service management system, requesting, by the encryption engine, a unique encryption key (k) from the secure third-party storage system using the key ID (KID) to reference the unique encryption key (k) and provide the another encryption key (KEK) to decrypt the unique encryption key (k). When the another encryption key (KEK) is verified against the stored one-way transformation of the KEK (KEKID), then the secure third-party storage system knows that the credentials are correct and actions the retrieve request to return the unique encryption key (k) and the key ID (KID).

Further, the method may include obtaining, by the encryption engine, the encrypted stored information asset from the distribution and delivery device based on the unique encryption key (k).

Further, the method may include decrypting, by the encryption engine, the encrypted stored information asset using the unique encryption key (k).

Furthermore, the method may include sending, by the encryption engine, the decrypted information asset to the distribution and delivery device.

According to another aspect of the present disclosure, the method also includes upon receiving the delete request, receiving, by the encryption engine, information from the service management system. The information may include such as, but not limited to, at least one of the delete request, a filename of the pre-stored information asset, the user identifying information (userID), the another encryption key (KEK) that was provided to the at least one user or stored in the service management system when the information asset was originally stored, and a key ID (KID) that was provided to the at least one user or stored in the service management system when the information asset was originally stored.

Further, the method may include sending, by the encryption engine, the another encryption key (KEK) and the key ID (KID) to the secure third-party storage system, wherein when the secure third-party storage system verifies that another encryption key (KEK) and the key ID (KID) are correct, then a key object comprising the pre-stored information asset is deleted to render the pre-stored information asset permanently unreadable.

Further, the method may include notifying, by the secure third-party storage system, the encryption engine about the deletion of the key object comprising the pre-stored information asset, wherein the encryption engine at least one of deletes the encrypted pre-stored information asset and directs the distribution and delivery system to delete the encrypted pre-stored information asset.

Another embodiment of the present disclosure provides a method of securely storing a plurality of information assets of at least one user. The method includes receiving, by a service management system, at least one information asset from the at least one user for storage. The method further includes receiving, by an encryption engine, the at least one information asset in its component files (e.g., image, video, text, spreadsheet, etc.) and unique identifying information (userID) of the at least one user from the service management system. The method also includes obtaining, by the encryption engine, a genuine random number (r) from a random number source. The method further includes using, by the encryption engine, the genuine random number (r) to create a unique encryption key (k). The method also includes generating, by at least one of the encryption engine or a secure third-party storage system, another encryption key (KEK) from a pseudo random number function. The method also includes encrypting, by the encryption engine, the at least one information asset by using the unique encryption key (k). The method also includes storing, by the encryption engine, the encrypted at least one information asset in a distribution and delivery device. Further, the method includes sending, by the encryption engine, at least one of the unique encryption key (k) and the another encryption key (KEK) to the secure third-party storage system. Further, the method includes encrypting, by the secure third-party storage system, the unique encryption key (k) using the another encryption key (KEK). Further, the method includes storing, by the secure third-party storage system, the resultant encrypted unique encryption key (eK) together with a one-way transformation of the KEK (KEKID). Further, the method includes generating, by the secure third-party storage system, a unique key ID (KID). Furthermore, the method includes returning, by the secure third-party storage system, the one-way transformation of the KEK (KEKID) and unique key ID (KID) to the encryption engine.

In some embodiments, the method may include receiving, by the service management system, a network address where the at least one information asset is located from the at least one user; and retrieving, by the service management system, the at least one information asset from the network address for storage.

Another embodiment of the present disclosure provides an information security system for managing a plurality of information assets of at least one user. The information system includes a service management system; an encryption engine; a random number source configured to generate one or more genuine random numbers; a distribution and delivery device; and a secure third-party storage system. The service management system is configured to receive at least one information asset from at least one user for storage. The encryption engine is configured to receive the at least one information asset in its component files (e.g., image, video, text, spreadsheet, etc.) and unique identifying information (userID) of the at least one user from the service management system. The encryption engine may also obtain a genuine random number (r) from the random number source and use the genuine random number (r) to create a unique encryption key (k). The encryption engine may also generate another encryption key (KEK) from a pseudo random number function. In some embodiments, the secure third-party storage system may generate the another encryption key (KEK) from a pseudo random number function. The encryption engine may encrypt the at least one information asset by using the unique encryption key (k). Further, the encryption engine may store the encrypted at least one information asset in the distribution and delivery device. Further, the encryption engine may send at least one of the unique encryption key (k) and the another encryption key (KEK) to the secure third-party storage system. The secure third-party storage system is configured to encrypt the unique encryption key (k) using the another encryption key (KEK) to create an encrypted unique encryption key (eK). In some embodiments, the secure third-party storage system may be configured to store, by the secure third-party storage system, the resultant encrypted unique encryption key (eK) together with a one-way transformation of the KEK (KEKID). Further, the secure third-party storage system generates a unique key ID (KID); and returns the one-way transformation of the KEK (KEKID) and unique key ID (KID) to the encryption engine.

In some embodiments, the service management system is further configured to: receive a network address where the at least one information asset is located from the at least one user; and retrieve the at least one information asset from the network address for storage.

In yet another aspect of the present disclosure, there is provided an information security system for managing information assets of at least one user including a service management system; an encryption engine; a random number source configured to generate on or more genuine random numbers; a distribution and delivery device; and a secure storage system, wherein any one or more of the foregoing is implemented on one or more corresponding devices.

Preferably, the one or more devices include any one or more of password protection; biometric protection; user authentication; and user authorization.

Preferably, the plurality of devices can be networked together in a private wired or wireless network.

Preferably, an information asset encrypted by the encryption engine is parecellable into one or more image files such that the encrypted asset information can be retrieved from the one or more image contained in the one or more image files.

Preferably, the one or more image is scannable to retrieve one or more corresponding encrypted asset information parcels.

Preferably, the image includes one or more positional markers to assist with accurate rescanning of the one or more images.

Preferably, the service management system further includes any one or more of access to the service management system by a single user of a single account; access to the service management by a plurality of users by an account corresponding to each user; and access to the service management system by a plurality of users of a single account wherein the single account is accessible by collaboration between one or more users.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
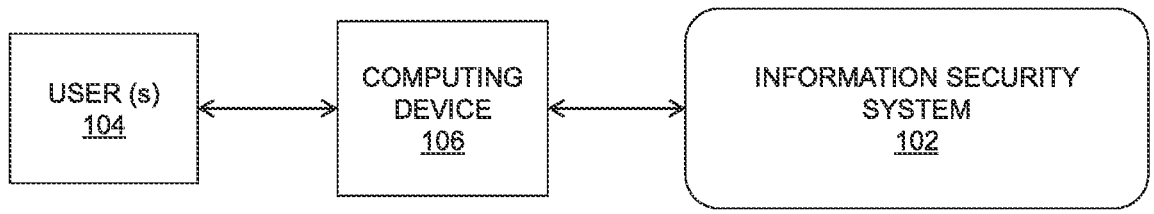
FIG. 1 is a schematic diagram illustrating an exemplary environment, where various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may comprise, for instance, one or more physical or logical blocks of computer instructions, which may be, for instance, organized as an object, procedure, function, or other construct. Nevertheless, the executable of an identified device need not be physically located together, but may comprise disparate instructions stored in different locations that, when joined logically together, comprise the device and achieve the stated purpose of the device.

Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network. Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

FIG. 1 is a schematic diagram illustrating an exemplary environment 100, where various embodiments of the present disclosure may function. As shown, the environment 100 includes an information security system 102 and a user 104 having an associated computing device 106 for accessing the information security system 102. In some embodiments, the user 104 may access the information security system 102 as a mobile application on their computing device 106. Alternatively, the user 104 can access the information security system 102 via a network address such as, but not limited to, a uniform resource locator (URL), a web link on a web browser (e.g., Internet Explorer, Google Chrome, etc.). In some embodiments, the information security system 102 may be present in a cloud network and the user 104 can access the system 102 by using the computing device 106. The computing device 106 may be any suitable electronic device having computation capability. Additionally, the computing device 106 can connect to a network such as the Internet. The non-limiting examples of the computing device 106 include a computer, a laptop computer, a smart watch, a smart television, a fitness tracker, a tablet computer, a digital data storage device, and so forth.

The information security system 102 may also be referred to as a system 102 throughout the present disclosure without change in its meaning or functionality. The system 102 may enable the user 104 (or multiple users) to manage a plurality of information assets associated with the user. The information asset may be any important information that the user 104 may want to preserve and/or keep confidential and it can be in any form; for example, an information file, an image file, a document, and so forth. The non-limiting examples of the information asset may include academic certificate, a passport, a driving license, job offer letters, pay slips, and so forth.

The system 102 can securely store a plurality of information assets of the user 104. The system 102 may also include a service management system. The service management system of the system 102 is configured to receive at least one information asset from the at least one user; e.g., the user 104, for storage. In some embodiments, the user 104 may present an information asset to be stored and protected to the service management system of the system 102. This may involve the presentation of the information asset (e.g., a file) itself or the presentation of an address where the information asset (e.g., the file) may be located in cloud storage. The service management system may present the information asset in its component files (e.g., image, video, text, spreadsheet, etc.) along with the user's unique identifying information to an encryption engine of the system 102.

The encryption engine receives the at least one information asset (e.g., the file) in its component files (e.g., image, video, text, spreadsheet, etc.) and unique identifying information (userID) of the at least one user from the service management system.

For each of the at least one information assets, the system 102 (or the encryption engine) obtains a genuine random number (r) from a random number source. In some embodiments, the encryption engine then uses the genuine random number (r) to create a unique encryption key (k) and generates another encryption key (KEK) from a pseudo random number function. The system 102 (e.g., encryption engine) encrypts the at least one information asset by using the unique encryption key (k). The system 102 (e.g., the encryption engine) stores the encrypted at least one information asset in a distribution and delivery device such as cloud storage (or in other implementations, stores on an offline storage device of the distribution and delivery device).

The system 102 (e.g., the encryption engine) then may send the unique encryption key (k) and the another encryption key (KEK) to a secure third-party storage system. The secure third-party storage system may then encrypt the unique encryption key (k) using the another encryption key (KEK) to create an encrypted unique encryption key (eK). Further, the system 102 may store the resultant encrypted unique encryption key (eK) together with a one-way transformation of the KEK (KEKID). Then the secure third-party storage system generates a unique key ID (KID); and returns the one-way transformation of the KEK (KEKID) and unique key ID (KID) to the encryption engine.

The information security system 102 provides a higher level of encryption strength than is available via existing commercial cloud security storage products. Further, the information security system 102 provides a level of security that is both independent and additional to what is provided via commercial cloud security storage solutions. Further, the information security system 102 allows a user, such as the user 104, to have individual and independent security encryption applied to each individual item within a compendium or library of information assets—such that individual rules of usage and access can be applied to each item, and that these rules may be different for each and every client that wishes to access the item. For example, in this case, an image, its title, and a narrative might all be separate items—even though they relate to the same information asset—and that each of these separate items may have different access permissions (e.g., read-only, no access, read/write) for each individual person who wishes to access them.

Further, the information security system 102 provides encryption that is not likely to be susceptible to brute force attack for at least 25 or more years, regardless of advances computing technology. Further, the information security system 102 permits the owner (e.g., the user 104) of the information asset to share the information asset with another individual at a future date, or under-prescribed events (such as death).

Further, the information security system 102 provides a security service that does not require a user to install or license either bespoke or commercial software on their client devices, and is capable of operating with any IP connected device (including macOS, Linux, Windows, Android, iOS devices, and so forth).

Further, the information security system 102 has no single point of failure, and has an architecture whereby some critical decryption key information for every item is stored in a place that is inaccessible from the Internet. The system generates and uses different keys for each and every individual component of an information asset, and then any compromise of encryption (whether intentional or not) is limited in impact to a very small level.

Further, the information security system 102 may provide additional steganographic and obfuscation techniques to store encrypted information that is very critical (such as user passwords and credentials) in addition to all other measures.

Further, the information security system 102 permits users (e.g., the user 104) to store their encrypted assets in any location of their preference.

Further, the information security system 102 may be accessed via an easy-to-use application-programming interface (API) that may be readily usable by small, medium business and in products offered to unsophisticated consumer users. In some embodiments, the encryption engine is accessed via API calls made by other modules of the system 102.

The information security system 102 provides an additional layer of security over and above commercially available solutions. The information security system 102 uses an application of independent encryption security on individual components of an information asset (e.g., a digital file). The information security system 102 provides security of the information asset(s) that has longevity and may not need re-encryption due to advance in computing technology over the coming decades. Security that permits a wide range of complex discretionary access controls to be applied to its use and to its user base.

The information security system 102 provides security that is readily available to small and unsophisticated users (e.g., the user 104) for any purpose via mobile applications or a uniform resource locator in a web browser on a computing device. In some embodiments, the information security system 102 may allow the user 104 to download a client application to access the system 102 present in a network, such as the cloud network.

The information security system 102 can be used to apply security to any kind of digital file. Further, the information security system 102 may protect key information or highly critical data such as, but not limited to, passwords, bank credentials, and email login credentials, and so forth.

In some embodiments, the information security system 102 provides security to the digital files or content and has no single point of failure, is not dependent on the veracity and integrity of the storage solution, and security that cannot be compromised even with multiple points of failure.

The information security system 102 may be used or implemented by any kind of business or individual who wishes to: store digital information safely for long periods of time; selectively share access to this information, or elements of this information, with specific individuals and with specific conditions of use either immediately or at a time in the future, or following a specified event; make public information available but protect the source file from modification or tampering; store the protected information over a range of storage solutions—now and into the future—without the need for re-encryption or re-ingestion; have guardians or legal representatives manage the dissemination of protected information without being privy to the contents.

In some embodiments, the information security system 102 may be used to securely store medical images and health records. Further, the information security system 102 may be used for storage and management of legal documents, but permitting managed access by distributed individuals and collaborators. The information security system 102 may ensure safe storage and management for copies of legal wills and deeds. In some embodiments, the information security system 102 may ensure safe storage of credentials and passwords for future use by guardians, legal representatives, or other delegates, at a future time or after a specified event. In an exemplary scenario, the information security system 102 may be used for safe storage of information in time capsules, safe archives, etc.

The information security system 102 may provide a sophisticated multi-file-type rights and access management system for small and medium businesses who may be geographically disparately located, have dispersed workforce with a range of usage devices, but with to manage and share key information safely and securely.

The information security system 102 may be used for archiving of security logs and assets (e.g., CCTV). Further, the information security system 102 enables safe locking of information that requires protection, and then storing the resultant information offline—or within another object.

The information security system 102 enables the user(s) 104 to manage sharing of protected information between different countries (including use of sophisticated encryption in countries that where it may not be available).

The information security system 102 may facilitate the user 104 to insert (and/or protect) critical information into visual objects (such as photographs) in the information file (or digital files) for later reference. This may be done to protect highly critical information.

For example, the system 102 may allow insertion of confidential medical information into a patient's medical image—so that a receiving medical practitioner may receive an accurate record of facts and medical comments. In another example, the system 102 may enable insertion of access credentials into an engineering drawing so that an authorized receiving party may access additional confidential information.

In some embodiments, the information security system 102 may categorize information types by access groups. Further, the information security system 102 may define and implement basic mandatory access controls on the digital files or assets in the system architecture. In some embodiments, the system 102 may define and secure one or more other systems that manage discretionary access controls and key management. In some embodiments, the information security system 102 may authenticate the user 104 using one or more user authentication processes. Further, the information security system 102 may define various forms or user security challenges and responses that are acceptable to users and suitable for this context. The information security system 102 may also determine or may help the user 104 to define or determine non-owner access and roles (i.e., trustees, guardians or system manager). The system 102 is a security arrangement that is independent to, and non-reliant upon, existing security in devices and cloud storage systems.

In some embodiments, the information security system 102 uses AES encryption, PPK encryption, quantum random number generation, steganography, commercial key lockers, and security certificates for ensuring security of digital files (or information assets) and/or a set of information and digital assets owned by an individual; e.g., the user 104 ("owner"). The non-limiting examples of the information asset may include items of highest personal value, personal secrets, legal and life documentation, records of health management and enduring guardianship requirements, and messages that have extreme highest personal value.

Figure 2:
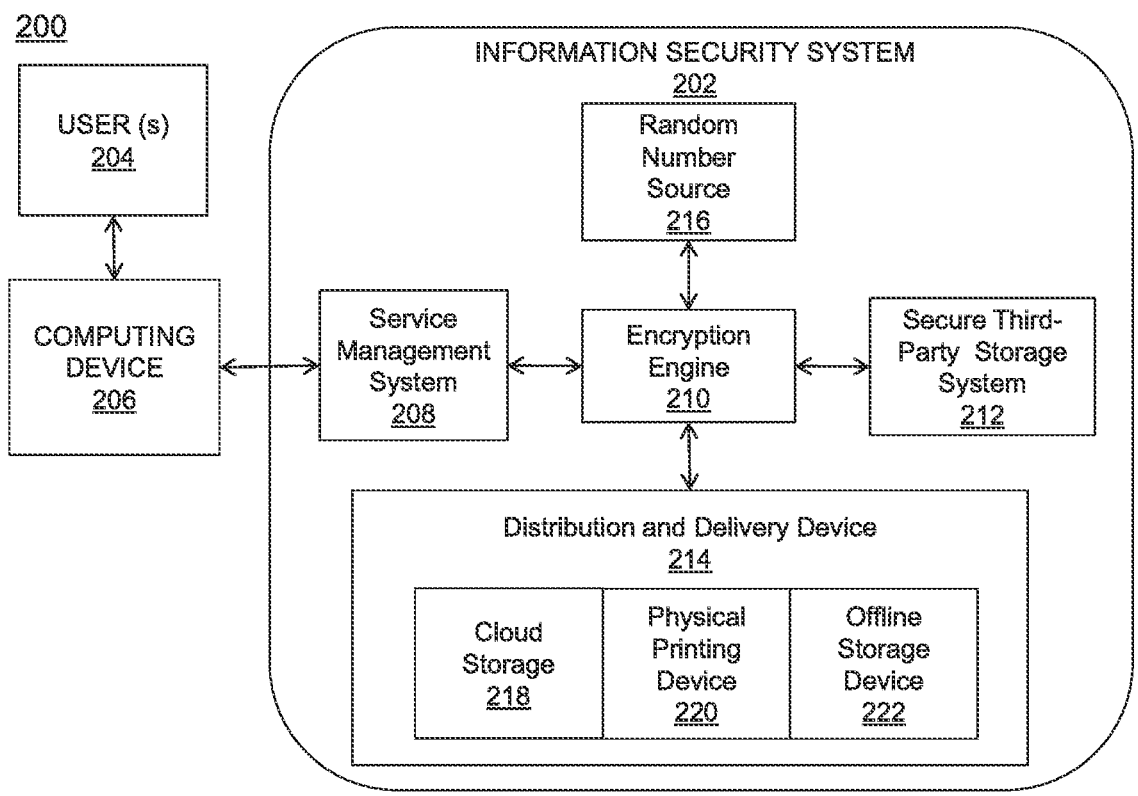
FIG. 2 is a block diagram illustrating various system elements of an exemplary system for information security, in accordance with an embodiment of the present disclosure.

FIG. 2 is a block diagram 200 illustrating various system elements of an information security system 202 in accordance with one or more embodiments of the present disclosure. As shown, at least one user 204 (or multiple users 204) can access the information security system 202 using his/her associated computing device 206. The information security system 202 includes a service management system 208, an encryption engine 210, a secure third-party storage system 212, a distribution and delivery device 214, and a random number source 216 (also referred as a genuine random number source). The distribution and delivery device 214 may further include a cloud storage 218, a physical printing device 220, and an offline storage device 222.

In some embodiments, when the at least one user 204 wants to access the system 202 for storing an information asset, then the at least one user 204 may register and then log in to the system 202 via the computing device 206. The system 202 may create a profile for the user 204 upon registration and may allow the at least one user 204 to upload an information asset, download his/her pre-stored information asset, delete a pre-stored information asset, and share the information asset with other users or devices.

The service management system 208 is configured to receive at least one information asset from the at least one user 204 for storage. The non-limiting example of the information asset may include a digital file. The service management system 208 can be implemented as a software application on a server. Alternatively, the service management system 208 may be implemented in an office or business network as a bespoke application, or it may be integrated with a specific user, or it may even be a physical office where objects/information assets are physically received. The service management system 208 is further configured to receive a network address where the at least one information asset is located from the at least one user 204. Further, the service management system 208 is configured to retrieve the at least one information asset from the network address for storage e.g., in a cloud storage. This means the at least one user 204 may present the file itself or an address where the file (i.e., the information asset) may be located in cloud storage to the service management system 208.

The encryption engine 210 is configured to receive the at least one information asset in its component files (e.g., image, video, text, spreadsheet, etc.) and unique identifying information (userID) of the user 204 from the service management system 208.

The random number source 216 may be configured to provide genuine random numbers to the encryption engine 210. The encryption engine 210 may generate one or more encryption keys based on the genuine random numbers. Further, the information security system 202 uses the genuine random number source i.e., the random number source 216 instead of a pseudo-random number generator (PRNG) for the creation of the key "k" (using non-deterministic-entropy). This ensures that these keys cannot be predicted, nor are they from a limited pool. This way, the random number source 216 may prevent brute force attack methods by future generations of computer technology. In some embodiments, the random number source 216 may use a genuine source of random numbers from the measurement of radioactive Caesium-137 decay.

The distribution and delivery device 214 may be configured to encrypt the at least one information asset using the one or more encryption keys; and store the encrypted information asset.

The secure third-party storage system 212 may be configured to accept the encrypted information asset for storing securely. Further, the secure third-party storage system 212 may be configured to return the stored encrypted information asset on demand upon presentation of correct credentials to the distribution and delivery device. The distribution and delivery device presents the information asset to the at least one user 204 upon receiving a retrieve request.

The encryption engine 210 may be configured to interconnect and communicate, for example, via strict, formal API protocols with at least one of the service management systems 208, the random number source 216, the distribution and delivery device 214, and the secure third-party storage system 212 for encrypting the information asset.

In some embodiments, the encryption engine 210 may be configured to obtain a genuine random number (r) from the random number source 216. The encryption engine 210 then may use the genuine random number (r) to create a unique encryption key (k). The encryption engine 210 generates another encryption key (KEK) from a pseudo random number function. The encryption engine 210 generates then encrypts the at least one information asset by using the unique encryption key (k). In some embodiments, the secure third-party storage system 212 generates the another encryption key (KEK) from a pseudo random number function and encrypts the at least one information asset by using the unique encryption key (k). In some embodiments, the encryption engine 210 may store the encrypted at least one information asset in the distribution and delivery device 214. In some embodiments, the encrypted information asset may be stored in the cloud storage 218. In alternative embodiments, the encrypted information asset may be stored on the offline storage device 222. The encryption engine 210 may also send the unique encryption key (k) and the another encryption key (KEK) to the secure third-party storage system 212.

The secure third-party storage system 212 is configured to encrypt the unique encryption key (k) using the another encryption key (KEK). Further, the secure third-party storage system 212 is configured to store the resultant encrypted unique encryption key (eK) together with a one-way transformation of the KEK (KEKID). Further, the secure third-party storage system 212 is configured to generate a unique key ID (KID) that corresponds to the eK. Furthermore, the secure third-party storage system 212 is configured to return the one-way transformation of the KEK (KEKID) and unique key ID (KID) to the encryption engine 210. The secure third-party storage system 212 may validate a received another encryption key (KEK) with the one-way transformation of the KEK (KEKID) by matching the one-way transformation of the KEK (KEKID) with the one-way transformation of the received another encryption key (KEK).

The encryption engine 210 may return the unique key ID (KID) and the another encryption key (KEK) to the service management system with the unique identifying information (userID) and filename of the at least one information asset. The encryption engine 210 may be configured to delete the unique encryption key (k), the unique key ID (KID), the another encryption key (KEK) and the original at least one information asset.

The service management system 208 is configured to enable the at least one user 204 to create an IP session with the service management system 208 or the system 202. The service management system 208 is configured to receive at least one of the retrieve requests and a delete request from the at least one user 204. The retrieve request may include a filename of the information asset to be retrieved. The delete request may include a filename of a pre-stored information asset to be deleted. The service management system 208 is configured to pass information comprising at least one of the retrieve request, the delete request, the unique identifying information (userID) that uniquely defines the user session, the filename of the information asset to be retrieved, the filename of the pre-stored information to be deleted, the another encryption key (KEK) that was provided to the at least one user or stored in the service management system 208 when the information asset was originally stored, a key ID (KID) that was provided to the at least one user or stored in the service management system 208 when the information asset was originally stored, an IP address, a file type, and a time period to the encryption engine 210.

In some embodiments, for retrieving the information asset on receiving the retrieve request, the encryption engine 210 is further configured to request a unique encryption key (k) from the secure third-party storage system 212 using the key ID (KID) to reference the unique encryption key (k) and provide the another encryption key (KEK) to decrypt the unique encryption key (k). When the another encryption key (KEK) is verified against the stored one-way transformation of the KEK (KEKID), then the secure third-party storage system 212 knows that the credentials are correct and actions the retrieve request to return the unique encryption key (k) and the key ID (KID). The encryption engine 210 obtains the encrypted stored information asset from the distribution and delivery device 214 based on the unique encryption key (k) and decrypts the encrypted stored information asset using the unique encryption key (k). The encryption engine 210 may send the decrypted information asset to the distribution and delivery device 214. In some embodiments, when Amazon cloud storage is used as the cloud storage 218, then the encryption engine 210 generates an AWS Cloudfront URL that permits the accredited IP address of the same user session (userID) to access the decrypted file for the period of time requested (usually allocated by the service management system 208). In implementations where the cloud storage 218 is not used (e.g., the offline storage device 222 is used), then the file, i.e., the information asset, is removed from the storage device 222, decrypted and either placed on offline media, or contents printed and securely couriered (e.g., registered mail) to the recipient, i.e., the user 204.

In other embodiments, for deleting the pre-stored information asset, the encryption engine 210 is further configured to receive information comprising at least one of the delete request, a filename of the pre-stored information asset, the user identifying information (userID), the another encryption key (KEK) that was provided to the at least one user or stored in the service management system 208 when the information asset was originally stored, and a key ID (KID) that was provided to the at least one user or stored in the service management system 208 when the information asset was originally stored from the service management system 208. The encryption engine 210 then may send the another encryption key (KEK) and the key ID (KID) to the secure third-party storage system 212. When the secure third-party storage system 212 verifies that another encryption key (KEK) and the key ID (KID) are correct, then a key object comprising the pre-stored information asset is deleted to render the pre-stored information asset permanently unreadable. The secure third-party storage system 212 notifies the encryption engine 210 about the deletion of the key object comprising the pre-stored information asset. The encryption engine may delete the encrypted pre-stored information asset and/or directs the distribution and delivery device 214 to delete the encrypted pre-stored information asset.

In an embodiment, the information security system 202 may be used by the user 204 for managing a plurality of information assets of the user 204. The service management system 208 is configured to receive at least one information asset from the user 204 for storage. The user 204 may provide the at least one information asset, e.g., a file, directly, or may provide a link or storage location address from where the file can be accessed for storage. In some embodiments, the service management system 208 is further configured to receive a network address, where the at least one information asset is located, from the user 204, and retrieve the at least one information asset from the network address for storage.

The encryption engine 210 is configured to receive the at least one information asset in its component files (e.g., image, video, text, spreadsheet, etc.) and unique identifying information (userID) of the user 204 from the service management system 208. The encryption engine 210 may obtain a genuine random number (r) from the random number source 216 and use the genuine random number (r) to create a unique encryption key (k). The genuine random number (r) may be a number (or a combination of alphabets, numbers or symbols) generated by the random number source 216 on demand in real-time. The encryption engine 210 may generate another encryption key (KEK) from a pseudo random number function and encrypt the at least one information asset by using the unique encryption key (k). In some embodiments, the secure third-party storage system 212 generates the another encryption key (KEK) from a pseudo random number function and encrypts the at least one information asset by using the unique encryption key (k). The encryption engine 210 may store the encrypted at least one information asset in the distribution and delivery device 214. The encryption engine 210 may send the unique encryption key (k) and the another encryption key (KEK) to the secure third-party storage system 212. The secure third-party storage system 212 is configured to encrypt the unique encryption key (k) using the another encryption key (KEK); and store, by the secure third-party storage system 212 (may also be referred as a third-party key store), the resultant encrypted unique encryption key (eK) together with a one-way transformation of the KEK (KEKID). The secure third-party storage system 212 is further configured to generate a unique key ID (KID) that corresponds to the eK. The secure third-party storage system 212 may return the another encryption key (KEK) and the unique key ID (KID) to the encryption engine. In some embodiments, the encryption engine 210 may pass the unique key ID (KID) and/or KEKID to the service management system 208, that may in turn pass the unique key ID (KID) and/or KEKID to the user 204.

The user 204 may be an individual consumer using personal computers, mobile phones and/or tablets of all varieties, connected to the general Internet. The service management system 208 may be implemented as or may include website and server(s). In some embodiments, the random number source 216 may be a commercially available product. The non-limiting examples of the secure third-party storage system 212 may include InterTrust Simple Key Management service or AWS Secrets Manager. The non-limiting examples of the distribution and delivery device 214 may include Amazon S3 storage and Amazon Cloudfront URL delivery service. The encryption engine 210 may communicate with the service management system 208, the secure third-party storage system 212, the distribution and delivery device 214, and the random number source 216 via strict, formal API protocols. Each of the above system elements 208-222 may be independent of each other. Each may be implemented via any technology or process (existing or future developed technologies). However, the system elements 208 and 212-222 may interconnect and communicate with the encryption engine 210 by a formal and structured process and methodology.

In an exemplary scenario, when the user 204 wishes to retrieve an information asset (or file) either temporarily for reference or for editing purposes, or permanently, then the user 204 may create an IP session with the service management system 208, and request the information asset via a retrieve request. The service management system 208 may then pass information to the encryption engine 210. The information may include such as, but not limited to, userID (which uniquely defines the user session); Filename being sought; a KEK key (that was provided to the user 204 or stored in the service management system 208 when file was originally stored); KID (that was provided to the user 204 or stored in the service management system 208 when file was originally stored); an IP address, a file type, time period, and so forth.

The encryption engine 210 then may request a key "k" from the secure third-party storage system 212 using the KID to reference it and it provides the key "KEK" to decrypt it. If the KEK verifies against the stored KEKID, then the secure third-party storage system 212 knows the credentials are correct and actions the request, returning the actual key "k" and KID. The encryption engine 210 then may obtain the encrypted stored file (or encrypted information asset) from storage (e.g., in the cloud storage 218) and decrypt it using the key "k" and makes a decrypted version of the information asset available in the storage. In an embodiment, if Amazon cloud storage is used, then the encryption engine 210 generates an AWS Cloudfront URL that permits the accredited IP address of the same user session (userID) to access the decrypted file for the period of time requested (usually allocated by the service management system). In alternative embodiments, where cloud storage 218 is not used, then the file is removed from storage, decrypted and either placed on offline media, or contents printed and securely couriered (e.g., registered mail) to the recipient.

In another exemplary scenario, if the user 204 wishes to delete a pre-stored information asset, e.g., a pre-stored file, then a delete request is sent to the service management system 208 via the computing device 206 of the user 204. The user 204 may send a delete request to the service management system 208 for the deletion of the pre-stored information asset (or the pre-stored file). The service management system 208, on receiving the delete request, passes information such as, but not limited to, a filename of the information asset, KEK, KID, and so forth to the encryption engine 210. The encryption engine 210 then may pass the KEK and KID to the secure third-party storage system 212. If the KEK is verified and the KID is true by the secure third-party storage system 212, then the key object is deleted—rendering the stored information asset permanently unreadable. The encryption engine 210 is advised of the result, i.e., the deletion of the key object, then the encryption engine 210 also deletes the stored encrypted information asset or directs destruction of the stored offline information asset (or stored offline file, e.g., from the offline storage device 222). Each of the above system elements 208-222 of the system 202 is independent of each other. Each of the system elements 208-222 may be implemented via any existing or future developed technology or process.

In some embodiments, the disclosed system 202 encrypts the protected files by using a suitable encryption method comprising such as, but not limited to, AES256 or AES128 encryption, or similar strength encryption. This ensures that the protected data is not subject to a brute force attack for a long period of time such as at least 30 years.

In some embodiments, the disclosed information security system 202 may use the secure third-party storage system 212 that may be a commercial security service. For example, Intertrust Simple Key Management and the AWS Secrets Manager can be used as the secure third-party storage system 212. However, for the achievement of security purposes, any storage facility with integrity may be used as secure third-party storage system 212 by the system 202. The information assets stored does not even need to be confidential, so long as it is simply maintained with integrity.

In some embodiments, the disclosed system 202 (or the encryption engine 210) generates a KEK (i.e., a key used to encrypt the encryption key "k") using a PRNG process, but the KEK is not used to protect the content or files. The system 202 or encryption engine 210 generates the KEK and passes the KEK with the key to be protected "k" to the secure third-party storage system 212. The secure third-party storage system 212 may use KEK to protect "k" and then may make a one-way transformation of it to KEKID and may store the KEKID as well in the database (or secure third-party storage system 212) of the system 202. The secure third-party storage system 212 then may return the KEK and KID to the encryption engine 210, once the key "k" is protected, and the encryption engine 210 returns KEK and KID to the service management system 208 (or the user 204). Neither the encryption engine 210 nor the third-party storage system 212 retains any copies of the KEK or k keys.

Further, in some embodiments, the encryption engine 210 is not connected to the general Internet. The encryption engine 210 may only be connected to three fixed connections; i.e., to the genuine random number source 216, the service management system 208, and the secure third-party storage system 212. All of these connections are connected to fixed servers, using defined structured protocols, over fixed connections.

Further, the service management system 208 (or the user 204) is in total control of whether the content is decrypted via their possession of KEK. The system 202 enables the user 204 to provide the KEK, for example, via an authorized/credentialed transaction—for the content to be decrypted.

No device or modules or the system elements 208-222 of the system 202 will store sufficient information to decrypt the content (or the information asset in its original form). If all devices or modules or the system elements 208-222 of the system 202 that are connected to the internet were attacked simultaneously and completely compromised such that all stored information was extracted, then also it would not be possible to decrypt the content due to being unable to associate the data. Hence, the disclosed methods and system 202 provide a secure way of storing the data or information asset of the user 204.

The use of the disclosed system 202 may make it impossible to simply attack the key store with invalid KEKs to withdraw all encrypted keys, as this is not permitted in the protocol. Furthermore, the secure third-party storage system 212 consumes and verifies the Customer Authentication (CA) token passed in the key request API call. The encryption engine 210 may only know the CA.

At no point in the entire process is the content stored in a complete format decrypted, except temporarily for delivery to the user 204. The time-to-live (TTL) is stored with the decrypted file, and the content is deleted using a scheduled disk removal process if TTL is exceeded. The TTL is stored in the service management system 208 for each item of content (i.e., the information asset), and is also used to set the TTL of the signed CDN distribution URL.

The information security system 202 may also use additional cryptographic protections offered by AWS—including an additional layer of AES encryption per object for storing the information in the Amazon Cloud Storage (AWS). 256-bit server-side encryption (AES256), Amazon S3 encrypts each object with a unique key. As an additional safeguard, it encrypts the key itself with a master key that rotates regularly.

In some embodiments, the disclosed system 202 may protect all the data or content in transit between the system elements 208-222 and the computing device 206 by using IP network encryption (TLS 2).

Further, each of the system elements 208-222 may include software, hardware, firmware, servers, databases, or combination of these.

Figure 3A:
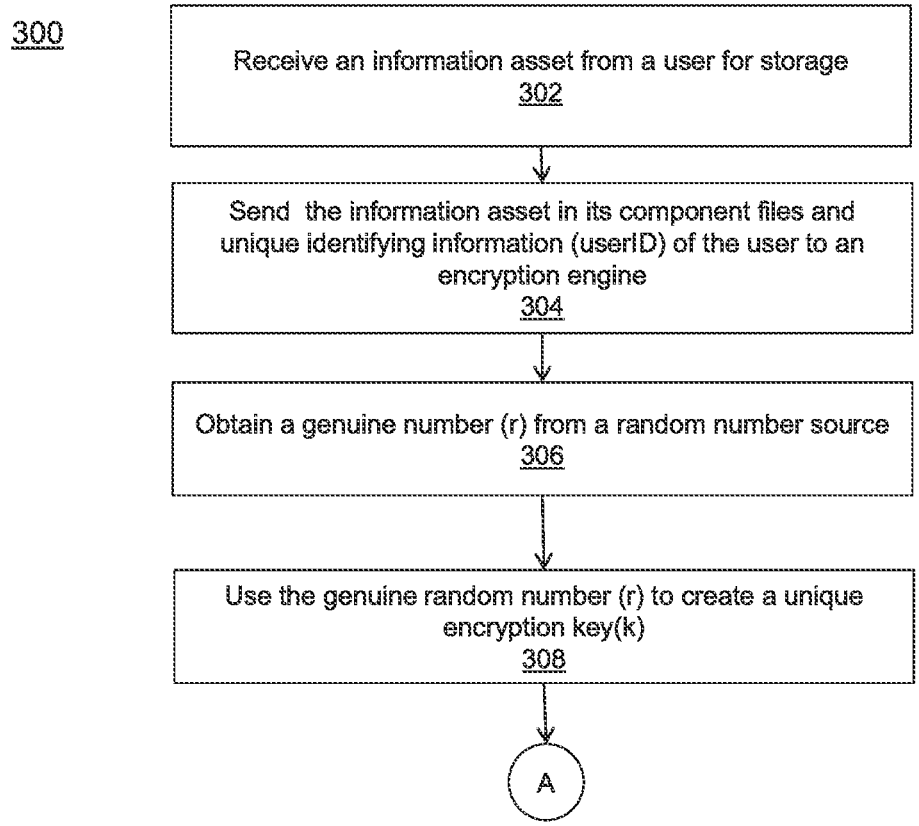
FIGS. 3A-3C show a flowchart diagram illustrating a method for using the exemplary information security system of FIG. 2, in accordance with an embodiment of the present disclosure.
Figure 3B:
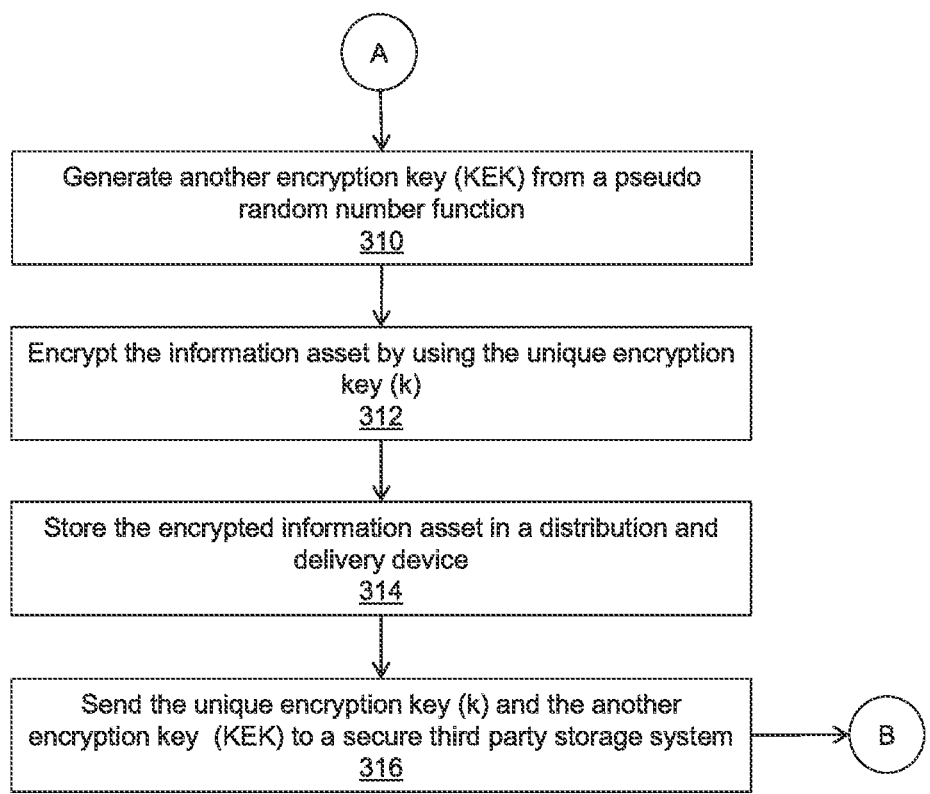
Figure 3C:
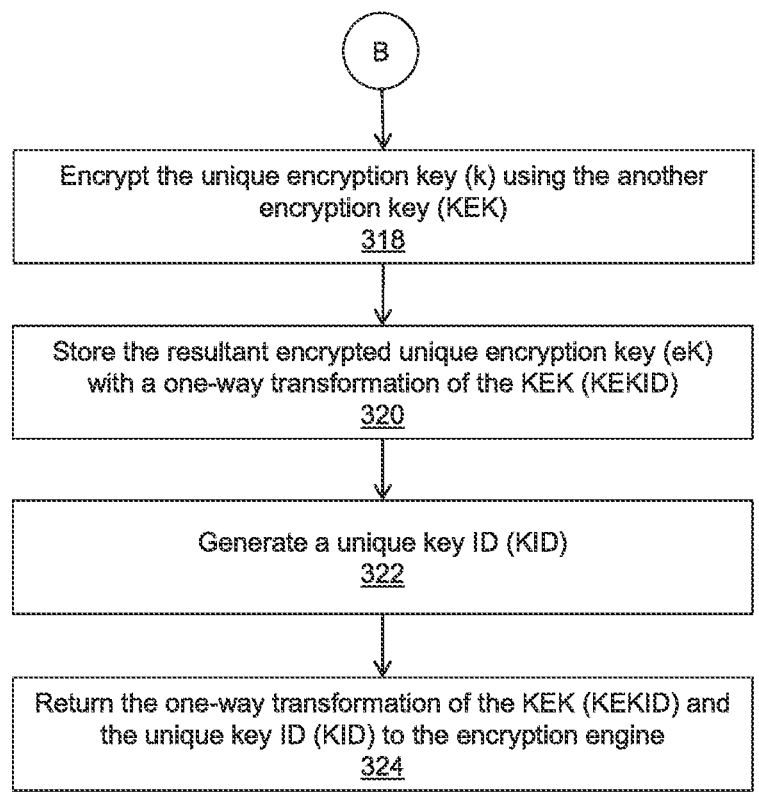

FIGS. 3A-3C show flowchart diagram 300 illustrating a method for using the exemplary information security system of FIG. 2, in accordance with an embodiment of the present disclosure.

At step 302, the system 202 receives an information asset from a user, such as the user 204, for storage. In some embodiments, the service management system 208 receives the information asset from the user 204 for storage.

At step 304, the service management system 208 sends the information asset in its component files and unique identifying information (userID) of the user 204 to the encryption engine 210. At step 306, the encryption engine 210 obtains a genuine random number (r) from the random number source 216. Then at step 308, the encryption engine 210 uses the obtained genuine random number (r) to create a unique encryption key (k).

At step 310, the encryption engine 210 generates another encryption key (KEK) from a pseudo random number function. In some embodiments, the secure third-party storage system 212 generates the another encryption key (KEK) from a pseudo random number function and encrypts the at least one information asset by using the unique encryption key (k). Then at step 312, the encryption engine 210 encrypts the information asset by using the unique encryption key (k). At step 314, the encryption engine 210 stores the encrypted information asset in the distribution and delivery device 214.

Then at step 316, the encryption engine 210 sends the unique encryption key (k) and the another encryption key (KEK) to the secure third-party storage system 212. Then at step 318, the secure third-party storage system 212 encrypts the unique encryption key (k) using the another encryption key (KEK). Thereafter at step 320, the secure third-party storage system 212 stores the resultant encrypted unique encryption key (eK) together with a one-way transformation of the KEK (KEKID). Then at step 322, the secure third-party storage system 212 generates a unique key ID (KID). Finally at step 324, the secure third-party storage system 212 returns the one-way transformation of the KEK (KEKID) and the unique key ID (KID) to the encryption engine 210. The encryption engine 210 may send the one-way transformation of the KEK (KEKID) and/or the unique key ID (KID) to the service management system 208. In some embodiments, the service management system 208 may store and/or send the one-way transformation of the KEK (KEKID) and/or the unique key ID (KID) to the user 204. Later, the user 204 may provide the one-way transformation of the KEK (KEKID) and/or the unique key ID (KID) for at least one of retrieving (via a retrieve request) or deleting (via a delete request) the stored information asset.

In some embodiments, the encryption engine (i.e., 210) creates k from r, and it only sends k to the secure third-party storage system (212). The third-party storage system creates KEK from a pseudo random number and encrypts k with the KEK, and stores an eK with a KEKID (i.e., one-way transformation of the KEK) and with KID (which it allocates). Then, the third-party storage system hands back the KEK and the KID to the encryption engine to pass back to the service management system. The k is never stored in any system anywhere. Further, the encryption engine never sees or get to know the eK, and never stores the k, the KEK, or the KID.

Further, for highly confidential/highly sensitive information, the encryption engine encrypts the information asset with k. The resultant encryption information is then converted to a character set that uses visible characters (i.e., A-Z, a-z, 0-9 only) in using a suitable Base64 method. The resultant Base64 version of the encrypted information asset is then input to a steganography algorithm. The image used by the steganography algorithm can be supplied by the user, or taken from the users profile. The result of the steganography algorithm is a digital image with hidden information—it is a misdirection to a potential hacker if they recover the target. This has the benefit to the user that they could then keep the information in their own custody without risk of compromise, and without having to worry about a third-party having custody of it.

The present disclosure provides an information security system that can be presented to the users as an online product, or via paid and unpaid subscription. The information security system provides a more secure way of collecting, retrieving and storing personal data in one place to the users for their own use as well as curating and sharing their most personal memories and precious information with selected friends and family, both now and in the future. The information security system meets the security requirements, and also permits the usability requirement. The information security system comprises two novel innovations that are used together. These include: security encryption technology itself and the method and ecosystem of applying the encryption.

Further the information security systems and methods of the present disclosure provides high and enduring encryption strength—given the encrypted information assets need to be protected for many years (i.e., several generations of future computing technologies). The information security systems and methods of the present disclosure have multiple barriers preventing a collapse in system security if one or relatively few core system components or devices or modules are compromised.

The information security systems and methods of the present disclosure may not compromise security if one user in a group has a compromised computer/client, or if a user deliberately becomes untrusted and reverse-engineers/compromises any individual, or group of, information assets.

The information security systems and methods of the present disclosure may prevent the system manager, or third parties, having clear access to valuable stored information under even compromised security arrangements (for reasons of trust in corporations and institutions (or lack of it)).

The information security systems and methods of the present disclosure may prevent the cu ration, sequence of release, and distribution arrangements a user sets up being compromised.

The information security systems and methods of the present disclosure implement complex discretionary access rules. The system is managed by people who are not necessarily in contact with the original owner of the information, or privy to the information protected. Further, the information security systems and methods can be applied independently to individual elements of a single composite item of the information (e.g., independently to text, image, video and other metadata elements).

The information security systems and methods of the present disclosure have support for users who forget or lose cryptographic key or access control information.

The information security systems and methods of the present disclosure have a way to recover information that is the subject of a legal warrant or court order.

The information security systems and methods of the present disclosure have a separate higher strength security partition for particularly sensitive information (such as passwords).

Even though it is implicit in the above, the information security systems and methods of the present disclosure may be called "zero-knowledge" system or method—whereby the information that is transmitted from user computers and stored on the cloud or network-based servers, cannot be reconstituted into its original information, under any circumstances, if a copy or extract is taken, or if a cloud server is compromised. The information security system may be used for protection of Highly Critical Information such as, but not limited to, passwords and user credentials for systems, computers, etc. This is generally information that is used to unlock other information that is important to a user. The information security system provides an option to the user for increased protection of critical information.

For example, when an information asset such as, a file that has a sensitive-confidential payload is passed to the encryption engine for encryption by the service management system, or the user, a different option is selected where an image file (of minimum quality) is passed together with a payload of information to be protected. The encryption engine then may convert the information to be protected into Base64 coding (this is an established technique) so that any data payload can be represented using printable ASCII characters (e.g., 0-9, a-z, A-Z, ./). It is two-way (i.e., reversible) and a Base64 file is larger than the original source materials. Providing the image file is significantly larger than the payload (usually by a factor of 10). In some embodiments, a steganographic encoding technique is used to embed the payload information into non-visible information in the image and the image file is then encoded in the usual way, and stored in the cloud storage (e.g., the distribution and delivery device). The particular steganographic approach that is selected is immaterial, so long as the resultant is invisible to the eye. The methodology selected embeds information into the least significant byte of configurable color (typically blue) information in an image—which renders it invisible. The additional security comes from the act that the protected information is an image containing invisible information. The actual steganographic algorithm whilst not a secret in itself is still unknown to the hacker, known only to the encryption engine and being steganography then not able to be deduced from the image—either visually or by processing as the encoding algorithm is unknown. Retrieval of the critical information is done in reverse.

In some embodiments, the information security system can be implemented completely and securely in cloud systems—such as AWS. This means that the information security system can be created/established in any region of the world.

In alternative embodiments, the information security system can also be implemented as a stand-alone encryption machine with genuine random number generation being carried out via measurements taken from a connected light, EMR or noise measurement device—anything that measures a natural phenomenon that can be converted into computer key data format.

The information security system is a completely portable and transferrable system—or elements can be centralized in specific territories.

Further, the information security system may keep the encrypted assets (e.g., encrypted information assets) in the cloud for convenience—but it is not a security requirement. Further, the encrypted assets are sufficiently secure to permit them to be in plain sight. For example, highly secure information could be placed into a visual object (of certain resolution and quality) and safely taken to a hostile environment without any theoretical chance of being hacked or decoded.

The advantages of the information security system may include: all of the benefits of individualized, asynchronous encryption technologies but with a 40-year lifetime. Further, the information security system is completely independent of storage medium used for protected assets—including no storage media at all, and changing storage technologies. Further, the information security system may not require any client-specific software programs and libraries to be developed and supported. Further, the information security system may not necessarily provide access to protected assets and protected access credentials to guardians of the protected assets and the protected access credentials. Further, the information security system may work with any IP connected device—irrespective of operating system in the device. Also the information security system is non-hackable (e.g., no network element or combination of network connected elements possess all information necessary to decrypt files). This means the system is hack proof. Hack proof in a sense not 1, not 2 but every system element (e.g., 208-222) in chain must be compromised for the information security system to fail versus systems like bitchain, which permit access on a simple majority decision.

In some embodiments, the information security system may work with a Software as a Service model.

In some embodiments, the information security system may provide longevity of encryption protection/encryption strength and there is no requirement for special or particular client software. Further, the system may provide support for complex discretionary access controls. The information system uses Steganography for protecting highly critical information assets.

In another aspect of the present disclosure, there is provided an information security system 202 for securing and/or managing information assets of one or more user(s) 204. The information system has a service management system 208 included for managing the service of the information security system 202, an encryption engine 210 in communication with the service management system 208, a random number source 216 configured to generate on or more genuine random numbers, the random number generator 216 being in communication with the encryption engine 210, a distribution and delivery device 214, the distribution and delivery device having a secure storage system (not shown), and includes any component/element disclosed within this specification deemed suitable or necessary. Each one of: the service management system 208, random number source 216, encryption engine 210, secure storage system (not shown), and distribution and delivery device 214 is preferably implemented in a single corresponding device. However, fewer or more device(s) ("host device(s)") can be used.

In a preferred embodiment of the present aspect of the present disclosure the host device(s) are portable electronic device(s) (not shown). The portable electronic device(s) could be specially manufactured device(s) containing memory storage and software that is installed at time of manufacture and unable to be changed, or it could be device(s) with a known operating system and secure application management system (such as an Apple iOS product, or a Google Android product)—or, a combination of these device(s) could be used.

The information security system 202 can implement password protection, biometric protection, user authentication and/or user authorization (not shown) to protect the information security system 202, which includes the one or more of the individual host devices (not shown). In an embodiment including a plurality of host devices (not shown) comprising the system 202, the devices (not shown) can be networked to together in a private wired or wireless network (not shown), the network being either completely separate from all other networks to thus increase security of the private network. In an embodiment the network can be connected to a wider network.

In use, the information asset entered by the user into for storage and/or protection by the information security system 202 (or 102) can be parceled into one or more image file(s) (not shown). The image file(s) (not shown) are configured such that the encrypted asset can be retrieved from the one or more images (not shown) by scanning the image(s) (not shown) whereby positional markers (not shown) are used to assist with accurately scanning of the image(s) (not shown) to enable retrieval of the information asset from the images.

In a preferred embodiment of the present aspect of the present disclosure, file(s) of type PNG, JPEG, GIF, or other file types can be used, wherein the image(s) corresponding to the file(s) are formatted to a specified minimum level of resolution (i.e., file size/detail) to allow the information asset to be retrieved.

In a preferred embodiment of the present disclosure the file(s) (not shown) can be written to a storage device(s), such a secured SD RAM (not shown), or the image(s) could be printed into a QR code, a graphic pattern, or some other image (not shown).

The present disclosure can be adapted to provide access to the service management system 208 by a single user 204 or a plurality of users 204 by means of one or more accounts corresponding to the one or more user. In a preferred form of the present disclosure, the present disclosure is adapted to provide access to the service management system by a plurality of user(s) of a single account wherein the single account is accessible by collaboration between one or more user(s) (not shown).

The information asset is made decryptable and accessible to the user(s) by means of access via one or more of the aforementioned service management system 208 types. The information asset in the form of the image(s) or file(s) is considered to be a "zero information" asset meaning that it is not possible to reconstruct the protected information without decryption by means of the information security system (102 or 202).

In an embodiment, the file(s) and/or the image(s) can be an essential requirement to reconstructing the secure information asset (not shown).

It will be appreciated that the embodiment of present disclosure described could be attractive to class of user who wished to retain absolute control of the encryption and decryption process, as well as absolute control of the resultant protected asset.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another device, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. An information security system comprising:
   a service management system configured to receive at least one information asset from at least one user for storage;
   an encryption engine configured to receive the at least one information asset in its component files and unique identifying information of the at least one user from the service management system;
   a random number source configured to provide genuine random numbers to the encryption engine, wherein the encryption engine generates one or more encryption keys based on the genuine random numbers;
   a distribution and delivery device configured to:
      encrypt the at least one information asset using the one or more encryption keys; and
      store the encrypted information asset; and
   a secure third-party storage system configured to:
      accept the encrypted information asset for storing securely; and
      return the stored encrypted information asset on demand upon presentation of correct credentials to the distribution and delivery device, wherein the distribution and delivery device presents the information asset to the at least one user upon receiving a retrieve request;
   wherein the encryption engine is further configured to:
      obtain a genuine random number from the random number source;
      use the genuine random number to create a unique encryption key, wherein the secure third-party storage system generates another encryption key from a pseudo random number function;
      encrypt the at least one information asset by using the unique encryption key;
      store the encrypted at least one information asset in the distribution and delivery device; and send the unique encryption key to the secure third-party storage system, wherein the secure third-party storage system is configured to encrypt the unique encryption key with another encryption key to create an encrypted unique encryption key;

wherein the secure third-party storage system is further configured to:
encrypt the unique encryption key using the another encryption key to create an encrypted unique encryption key;
store the resultant encrypted unique encryption key together with a one-way transformation of the another encryption key;
generate a unique key ID that corresponds to the encrypted unique encryption key;
return the another encryption key and the unique key ID to the encryption engine; and
validate a received another encryption key with the one-way transformation of the another encryption key by matching the one-way transformation of the another encryption key with the one-way transformation of the received another encryption key;

wherein the encryption engine is further configured to:
return the unique key ID and the another encryption key to the service management system with the unique identifying information and filename of the at least one information asset; and
delete the unique encryption key, the unique key ID, the another encryption key and the original at least one information asset; and wherein the service management system is further configured to:
enable the at least one user to create an IP session with the service management system;
receive at least one of the retrieve request and a delete request from the at least one user,
wherein the retrieve request comprising a filename of the information asset to be retrieved, wherein the delete request comprising a filename of a pre-stored information to be deleted; and
pass information comprising at least one of the retrieve request, the delete request, the unique identifying information, the filename of the information asset to be retrieved, the filename of the pre-stored information asset to be deleted, the another encryption key that was provided to the at least one user or stored in the service management system when the information asset was originally stored, a key ID that was provided to the at least one user or stored in the service management system when the information asset was originally stored, an IP address, a file type, and a time period to the encryption engine.

2. The information security system of claim 1, wherein the service management system is further configured to:
receive a network address where the at least one information asset is located from the at least one user; and
retrieve the at least one information asset from the network address for storage.

3. The information security system of claim 1, wherein for retrieving the information asset, the encryption engine is further configured to:
request a unique encryption key from the secure third-party storage system using the key ID to reference the unique encryption key and provide the another encryption key to decrypt the unique encryption key, wherein when the another encryption key is verified against the stored one-way transformation of the another encryption key, then the secure third-party storage system knows that the credentials are correct and actions the retrieve request to return the unique encryption key and the key ID;
obtain the encrypted stored information asset from the distribution and delivery device based on the unique encryption key;
decrypt the encrypted stored information asset using the unique encryption key; and
send the decrypted information asset to the distribution and delivery device.

4. The information security system of claim 1, wherein for deleting the pre-stored information asset, the encryption engine is further configured to:
receive information comprising at least one of the delete request, a filename of the pre-stored information asset, the user identifying information, the another encryption key that was provided to the at least one user or stored in the service management system when the information asset was originally stored, and a key ID that was provided to the at least one user or stored in the service management system when the information asset was originally stored from the service management system; and
send the another encryption key and the key ID to the secure third-party storage system,
wherein when the secure third-party storage system verifies that another encryption key and the key ID are correct, then a key object comprising the pre-stored information asset is deleted to render the pre-stored information asset permanently unreadable;
further wherein the secure third-party storage system notifies the encryption engine about the deletion of the key object comprising the pre-stored information asset; and
wherein the encryption engine at least one of deletes the encrypted pre-stored information asset and directs the distribution and delivery system to delete the encrypted pre-stored information asset.

5. The information security system of claim 1, wherein the encryption engine is further configured to:
encrypt an information asset with a unique encryption key;
convert the resultant encrypted information asset to a character set that uses visible characters using the Base64 method; and
input the resultant Base64 version of the resultant encrypted information asset comprising an image of resultant encrypted information asset to a steganography algorithm, wherein the steganography algorithm is used to hide the resultant encrypted information asset within an image, further wherein the image used by the steganography algorithm is at least one of supplied by the user, or taken from the user's profile.

6. A method of managing a plurality of information assets of at least one user, comprising:
receiving, by a service management system, at least one information asset from the at least one user for storage;
receiving, by an encryption engine, the at least one information asset in its component files and unique identifying information of the at least one user from the service management system;
providing, by a random number source, genuine random numbers to the encryption engine for generating one or more encryption keys;

encrypting, by a distribution and delivery device, the at least one information asset using the one or more encryption keys;

storing, by a distribution and delivery device, the encrypted information asset;

accepting, by a secure third-party storage system, the encrypted information asset for storing securely;

returning, by the secure third-party storage system, the stored encrypted information asset on demand upon presentation of correct credentials to the distribution and delivery device, wherein the information asset is presented to the at least one user, by the distribution and delivery device, upon receiving a retrieve request;

receiving, by the service management system, a network address where the at least one information asset is located from the at least one user;

retrieving, by the service management system, the at least one information asset from the network address for storage;

obtaining, by the encryption engine, a genuine random number from the random number source;

using, by the encryption engine, the genuine random number to create a unique encryption key;

generating, by at least one of the encryption engine and the secure third-party storage system, another encryption key from a pseudo random number function;

encrypting, by the encryption engine, the at least one information asset by using the unique encryption key;

storing, by the encryption engine, the encrypted at least one information asset in the distribution and delivery device;

sending, by the encryption engine, the unique encryption key and the another encryption key to the secure third-party storage system;

encrypting, by the secure third-party storage system, the unique encryption key using the another encryption key to create an encrypted unique encryption key;

storing, by the secure third-party storage system, the resultant encrypted unique encryption key together with a one-way transformation of the another encryption key;

generating, by the secure third-party storage system, a unique key ID that corresponds to the encrypted unique encryption key;

returning, by the secure third-party storage system, the another encryption key and the unique key ID to the encryption engine;

validating, by the secure third-party storage system, a received another encryption key with the one-way transformation of the another encryption key by matching the one-way transformation of the another encryption key with the one-way transformation of the received another encryption key;

returning, by the encryption engine, the unique key ID and the another encryption key to the service management system with the unique identifying information and filename of the at least one information asset;

deleting, by the encryption engine, the unique encryption key, the unique key ID, the another encryption key, and the original at least one information asset;

enabling, by the service management system, the at least one user to create an IP session with the service management system;

receiving, by the service management system, at least one of the retrieve request and a delete request from the at least one user, wherein the retrieve request comprising a filename of the information asset to be retrieved, wherein the delete request comprising a filename of a pre-stored information to be deleted; and sending, by the service management system, information comprising at least one of the retrieve request, the delete request, the unique identifying information, the filename of the information asset to be retrieved, the filename of the pre-stored information to be deleted. the another encryption key that was provided to the at least one user or stored in the service management system when the information asset was originally stored, a key ID that was provided to the at least one user or stored in the service management system when the information asset was originally stored, an IP address, a file type, and a time period to the encryption engine.

7. The method of claim 6, further comprising:

upon receiving the retrieve request from the service management system, requesting, by the encryption engine, a unique encryption key from the secure third-party storage system using the key ID to reference the unique encryption key and provide the another encryption key to decrypt the unique encryption key, wherein when the another encryption key is verified against the stored one-way transformation of the another encryption key, then the secure third-party storage system knows that the credentials are correct and actions the retrieve request to return the unique encryption key and the key ID;

obtaining, by the encryption engine, the encrypted stored information asset from the distribution and delivery device based on the unique encryption key;

decrypting, by the encryption engine, the encrypted stored information asset using the unique encryption key; and sending, by the encryption engine, the decrypted information asset to the distribution and delivery device.

8. The method of claim 6, further comprising:

upon receiving the delete request, receiving, by the encryption engine, information from the service management system, wherein the information comprises at least one of the delete request, a filename of the pre-stored information asset, the user identifying information, the another encryption key that was provided to the at least one user or stored in the service management system when the information asset was originally stored, and a key ID that was provided to the at least one user or stored in the service management system when the information asset was originally stored;

sending, by the encryption engine, the another encryption key and the key ID to the secure third-party storage system, wherein when the secure third-party storage system verifies that another encryption key and the key ID are correct, then a key object comprising the pre-stored information asset is deleted to render the pre-stored information asset permanently unreadable; and notifying, by the secure third-party storage system, the encryption engine about the deletion of the key object comprising the pre-stored information asset, wherein the encryption engine at least one of deletes the encrypted pre-stored information asset and directs the distribution and delivery system to delete the encrypted pre-stored information asset.

\* \* \* \* \*